(12) United States Patent
Johnson

(10) Patent No.: US 7,475,351 B1
(45) Date of Patent: Jan. 6, 2009

(54) INTERACTIVE DRAG AND SNAP CONNECTION TOOL

(75) Inventor: Joshua M. Johnson, Morgan Hill, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 864 days.

(21) Appl. No.: 10/726,947

(22) Filed: Dec. 2, 2003

(51) Int. Cl.
G06F 15/177 (2006.01)
(52) U.S. Cl. .................................................. 715/736
(58) Field of Classification Search ................ 715/751, 715/736
See application file for complete search history.

(56) References Cited

U.S. PATENT DOCUMENTS

| | | | |
|---|---|---|---|
| 5,226,120 A | 7/1993 | Brown et al. | |
| 5,363,483 A | 11/1994 | Jones et al. | |
| 5,420,968 A | 5/1995 | Johri | |
| 5,710,897 A | 1/1998 | Schneider et al. | |
| 5,751,965 A | 5/1998 | Mayo et al. | |
| 5,831,610 A * | 11/1998 | Tonelli et al. | 715/735 |
| 5,883,636 A | 3/1999 | Hayashi et al. | |
| 6,338,680 B1 | 1/2002 | Connors | |
| 6,476,828 B1 | 11/2002 | Burkett et al. | |
| 6,622,060 B1 | 9/2003 | Yamazaki | |
| 6,738,079 B1 | 5/2004 | Kellerman et al. | |
| 6,772,204 B1 * | 8/2004 | Hansen | 709/220 |
| 6,801,507 B1 | 10/2004 | Humpleman et al. | |
| 6,806,890 B2 | 10/2004 | Audelman et al. | |
| 6,839,747 B1 * | 1/2005 | Blumenau et al. | 709/223 |
| 6,845,395 B1 | 1/2005 | Blumenau et al. | |
| 6,970,919 B1 * | 11/2005 | Doi et al. | 709/220 |
| 7,024,419 B1 | 4/2006 | Klenk et al. | |
| 7,200,683 B1 | 4/2007 | Wang et al. | |
| 7,231,442 B2 | 6/2007 | Chen | |
| 2002/0050995 A1 | 5/2002 | Crotty et al. | |
| 2002/0075297 A1 | 6/2002 | Boulter | |
| 2003/0163582 A1 | 8/2003 | Inoue et al. | |
| 2003/0184585 A1 | 10/2003 | Lin et al. | |

(Continued)

FOREIGN PATENT DOCUMENTS

EP 1338986 A2 8/2003

(Continued)

OTHER PUBLICATIONS

U.S. Appl. No. 10/794,165, filed Mar. 4, 2004.

(Continued)

Primary Examiner—Stephen Hong
Assistant Examiner—Le Nguyen
(74) Attorney, Agent, or Firm—Hickman Palermo Truong & Becker LLP

(57) ABSTRACT

Embodiments of the present invention are directed to a method and system for managing a configurable network, which comprises presenting a graphical display of a plurality of graphical features representing nodes in the configurable network, accepting a user selection of a first graphical feature representing a first node, determining allowability of a connection to a second node if a second graphical feature representing the node is in graphical proximity to a cursor in the display, indicating allowability if connection to the second node is allowable, accepting a user selection of the second graphical feature, presenting a graphical representation of the allowable connection between the first node and the second node, and implementing the connection in the network.

20 Claims, 11 Drawing Sheets

U.S. PATENT DOCUMENTS

| | | |
|---|---|---|
| 2003/0222912 A1 | 12/2003 | Fairweather |
| 2004/0003067 A1 | 1/2004 | Ferrin |
| 2004/0024573 A1 | 2/2004 | Allen et al. |
| 2004/0119757 A1 | 6/2004 | Corley et al. |
| 2004/0172615 A1 | 9/2004 | Beltran et al. |
| 2005/0010877 A1 | 1/2005 | Udler |

FOREIGN PATENT DOCUMENTS

| | | |
|---|---|---|
| JP | 2004206203 A | 7/2004 |

OTHER PUBLICATIONS

U.S. Appl. No. 10/794,288, filed Mar. 4, 2004.

Applicant's Statement (1 pg.), Jul. 6, 2004.

* cited by examiner

100

```
┌─────────────────────────┐
│    100                  │
│    START PROCESS        │
└───────────┬─────────────┘
            ▼
┌─────────────────────────────────────────────────┐
│ 110   PRESENT DISPLAY OF PLURALITY OF GRAPHICAL │
│       FEATURES REPRESENTING NODES IN NETWORK;   │
└───────────┬─────────────────────────────────────┘
            ▼
┌─────────────────────────────────────────────────┐
│ 120   ACCEPT USER SELECTION OF FIRST GRAPHICAL  │
│       FEATURE REPRESENTING A FIRST NODE         │
└───────────┬─────────────────────────────────────┘
            ▼
┌─────────────────────────────────────────────────────────┐
│ 130   DETERMINE ALLOWABILITY OF CONNECTION              │
│ TO A SECOND NODE IF SECOND GRAPHICAL FEATURE REPRESENTING│
│ THE SECOND NODE IS IN GRAPHICAL PROXIMITY TO            │
│ USER-MOVABLE CURSOR.                                    │
└───────────┬─────────────────────────────────────────────┘
            ▼
┌─────────────────────────────────────────────────┐
│ 140   INDICATE ALLOWABLE CONNECTABILITY IF      │
│       CONNECTION TO SECOND NODE IS ALLOWABLE    │
└───────────┬─────────────────────────────────────┘
            ▼
┌─────────────────────────────────────────────────┐
│ 150   ACCEPT USER SELECTION OF SECOND           │
│       GRAPHICAL FEATURE                         │
└───────────┬─────────────────────────────────────┘
            ▼
┌─────────────────────────────────────────────────┐
│ 160   PRESENT GRAPHICAL REPRESENTATION OF       │
│ ALLOWABLE CONNECTION BETWEEN FIRST NODE AND     │
│ SECOND NODE                                     │
└───────────┬─────────────────────────────────────┘
            ▼
┌─────────────────────────────────────────────────┐
│ 170   IMPLEMENT INDICATED CONNECTION IN         │
│       NETWORK                                   │
└───────────┬─────────────────────────────────────┘
            ▼
┌─────────────────────────┐
│    199                  │
│    END PROCESS          │
└─────────────────────────┘
```

201
NODE

202
NODE

205
NODE

203
NODE

204
NODE

FIGURE 2

INTERACTIVE DRAG AND SNAP CONNECTION TOOL

BACKGROUND

A strength of modern networking derives from the ability of electronic devices to communicate with other devices. It has been useful to communicate with and control remotely located computers and access data in databases far removed from a user's location.

Networks, however, can comprise large numbers of devices. The complexity of networks continues to expand as does the application of network concepts to more and more disciplines and environments. Increasing types of devices with differing specifications are added to the growing list of elements within modern networks. A network may consist of a variety of types of devices, communicating over a variety of media and using various protocols. Such networks might include wireless devices, traditional voice, ATM, Frame Relay, Cable, DSL, and dial platforms. Optical networks are also becoming increasingly popular for performance reasons.

Recent trends in network technology have seen large enterprises and other users moving towards provisionable, or reconfigurable, networks. A provisionable network allows an enterprise to rapidly adapt to differing needs and to different conditions over time by the reconfiguration of network connections using software rather than physically manipulating the connection cables.

Management tools have been developed to cope with the demands imposed by both initial network layout and reconfiguration. Tools now exist that allow a network manager to view a graphic display of network resources in the form of network nodes and connections between them, and to form the connections during configuration.

However, in a heterogeneous node environment, some nodes may be connected, while others may not. Nodes, which can represent servers, computers, workstations, subnets, data banks, firewalls, etc., in the network, cannot always be connected directly to each other, due to the constraints of a node's various interface ports (e.g., Ethernet, SCSI, fiber-optic channel).

Typically, a network manager seeks out each connectable network resource for each device which needs interconnection, and forms a connection in the management tool. When a connection is formed between incompatible nodes in this manual and trial-and-error process, the manager may not discover the incompatibility until errors occur in network operation. Trial-and-error node connection techniques can be error-prone and tedious. This situation may be exacerbated when a manager is given no feedback as to whether nodes may or may not be connected until after a connection has been attempted.

SUMMARY

Accordingly, a method and system are presented which provide an interactive, interconnection tool that eliminates trial-and-error node connection techniques. Embodiments are directed to the computer-aided layout and interconnection of remotely located nodes in a network.

Specifically, embodiments of the present invention are directed to a method and system for managing a configurable network, which comprise presenting a graphical display of a plurality of graphical features representing nodes in the configurable network. A user selection is accepted of a first graphical feature representing a first node, and then the allowability of a connection to a second node is determined if a second graphical feature representing the node is in graphical proximity to a cursor in the display. The allowability of connection to the second node is then indicated. A user selection of the second graphical feature is accepted and a graphical representation of the allowable connection is presented between the first node and the second node. Then the connection in the network is implemented.

One embodiment, referred to herein as an interactive drag and snap connection tool, allows users to quickly connect two compatible nodes in a graphical depiction of an environment with heterogeneous nodes. The connection tool allows a user to "mouse-down" (e.g., press a mouse button) on an icon representing a node, and then drag a connection cursor away from the node icon (this operation can also be known as drag-and-drop). In one embodiment, the connection cursor has a tunable, or user selectable, radius of influence, or snap radius, such that any time another node icon, whose represented node is capable of being connected, enters the radius of influence, a second tentative connection line is formed between the connection cursor and the second node icon. At this point the user can stop dragging the connection cursor by releasing the mouse button, and the two nodes can become connected. A graphical depiction of the connection between the icons representing the nodes is displayed in one example. Also, a visual depiction of the radius of influence is also displayed while in mouse-down mode, e.g., a circle.

In the event that no compatible node exists whose representative node icon is within the radius of influence at the time the mouse button is released, the connection is invalidated. If more than one compatible node icon exists within the radius of influence, the tentative connection is formed with the node icon that is closest to the connection cursor, in one embodiment. At user command, the depicted tentative connections can be implemented at the network level.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The operation and components of embodiments of this invention can be best visualized by reference to the drawings.

FIG. 1 illustrates, in a block flow diagram, a method for network connection in accordance with an embodiment of the present invention.

FIG. 2 illustrates a graphical display of network nodes in accordance with an embodiment of the present invention.

DETAILED DESCRIPTION

Figure 3:
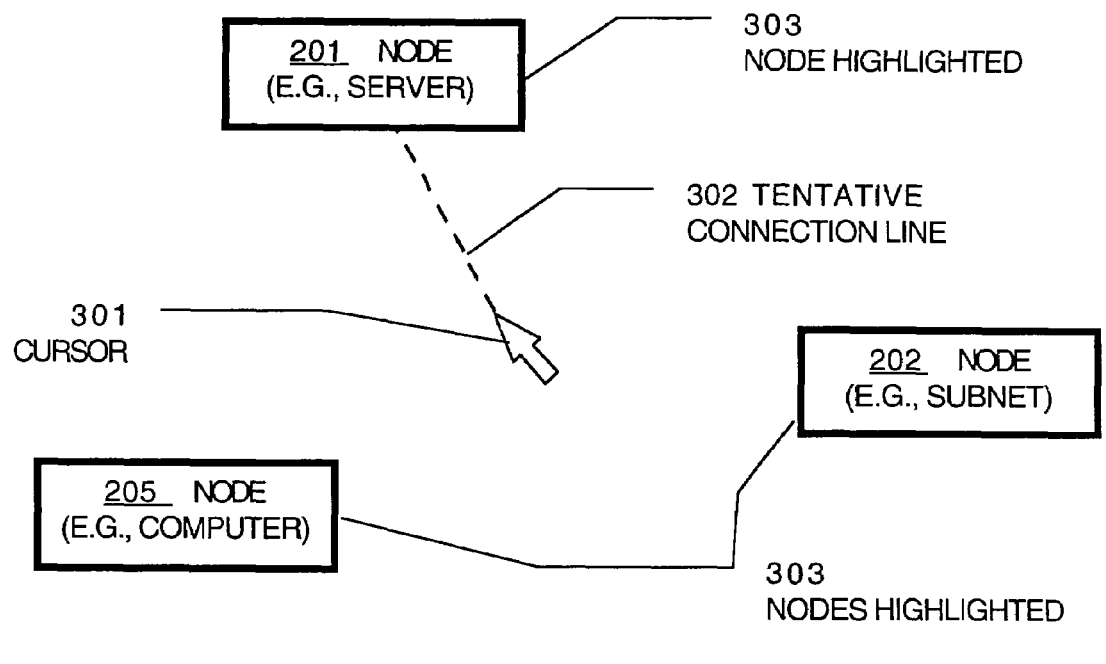
FIG. 3 illustrates an exemplary graphical display of a first tentative network connection in accordance with an embodiment of the present invention.

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be obvious to one of ordinary skill in the art that the present invention may be practiced without these specific details. In other instances, well-known methods, procedures, and components have not been described in detail so as not to unnecessarily obscure aspects of the present invention. At times, concepts disclosed in this discussion of embodiments of the present invention will be made more readily apparent by reference to the Figures.

FIG. 1 illustrates, in block flow form, one embodiment of a computer implemented method for managing node interconnections in a configurable network. Process 100 commences at step 110 by presenting a display of graphical features, or icons, representing connectable nodes in a network. A connectable node, in one embodiment, can be a hardware firewall, a server which can comprise a computer such as a desktop computer, an external subnet, a load balancer, an unmanaged device, a subnet, or any network connection. It is noted here that a subnet can include a variety of configurations and complexities of nodes and interconnections. As an example, a personal area network or work center can comprise a subnet. On a larger scale, a subnet can comprise a plurality of other subnets which themselves can comprise a plurality of network nodes. In general, a subnet can include any network of computer systems and peripherals capable of communicating to one another.

Process 100 continues at step 120 by accepting user input which selects a network node icon. It is noted that numerous methods for entering user input are known. However, one common input method that may be used is by mouse click or "mouse-down" and "mouse-up." "Mouse-down" and "mouse-up" in this discussion, are meant to denote a user pressing of a mouse button (mouse-down) and releasing (mouse-up). In one embodiment, selection is accepted when the user depresses the mouse selection button (mouse-down). In another embodiment, selection is acknowledged as long as the mouse button is depressed. Once released, selection is no longer acknowledged unless the mouse cursor is in position to select another icon. Yet another embodiment maintains the acknowledgement of a selection when the button is released (mouse-up) and keeps it until the button is depressed again.

When user input is accepted at step 120, in one embodiment of the present invention, the selected node icon can be highlighted. Another indication of a selection, in this embodiment, is the presentation in the display of a moving connection line that originates in the selected node icon and terminates at the displayed cursor. In one embodiment, this moving line can be called a "tentative connection" line. User input is also acknowledged, in one embodiment, by the display of a circle, centered on the cursor, which indicates a radius of influence, or "snap radius," which graphically indicates the proximity of the cursor to a target node icon for a second selection, this time of a node to which the first node can be connected.

It is noted here that network nodes are necessarily connectable to other nodes. For any node in a configurable network, though, there are only certain other types of nodes to which a connection can be made. For example, a network server can connect to a subnet but not directly to a hardware firewall. In order to communicate with an external node through a firewall, a server node connects through the subnet node. Embodiments of the present invention maintain a database of nodes and a set of connection rules for connections between them and this database can be queried in order to determine the allowability of a connection between any two nodes.

It is also noted that many nodes in a network are enabled with a plurality of connectable ports. Embodiments of the present invention are enabled to connect, when implementing a connection, to an appropriate port in a node.

It is further noted that this discussion refers to "nodes," "node icons," "nodes represented by icons" and other terms in which "node" and "icon" are used frequently. In this discussion, the term "node" is intended to refer to component of a network, whether a device or a subnet. The term "icon" is intended to refer to graphic depictions that represent nodes. When the discussion refers to a display of a node, the icon or other graphical feature that is intended to represent the node is what is actually displayed.

In FIG. 1, according to one embodiment of the present invention, step 130 determines the allowability of a connection between the selected node and another node. In another embodiment, a selection of a first node causes a recursive evaluation of a plurality of available nodes for allowable connections. Icons representing those nodes to which connection can be made are highlighted in the graphic display.

In one embodiment of the present invention, a node is only evaluated when it is either selected by the user or, in embodiments in which a snap radius is implemented, when the node becomes the closest target to the cursor and lies within the snap radius of a selected node. In this example, the second node icon is highlighted only after coming within the snap radius and the node is evaluated for compatible connectability.

At step 140, the node's allowable connectability is indicated if such determination is made. In an embodiment in which allowability is determined for a plurality of nodes at, each allowable node icon can be highlighted with the non-allowable nodes' icons left unhighlighted. In this way, the user can ascertain quickly which nodes are compatible and which are not.

In one embodiment of the present invention, indication of the allowability of connection is made by presenting a second tentative connection line between the cursor and the closest second icon within the snap radius that represents an allowable node connection to the first node selected. When a tentative line is presented, user selection at that point selects the connection represented. In another embodiment, indication of allowability can be made by highlighting the node icons for whose nodes connection is allowable.

At step 150, in this embodiment, the user's selection of a desired connection is accepted. In one embodiment, picking, or selecting, the icon with the mouse cursor causes selection of the desired connection. In another embodiment, "mouse-up,' or releasing the mouse drag button, when the second tentative connection line is visible, results in selection of the indicated connection. If connection to the node is not allowable or if the node's icon is not within the snap radius when selection is attempted, no selection is accepted.

At step 160, the selected connection is illustrated in the graphical display by a fixed line between the connected nodes' icons. When the connection is indicated the tentative connection lines are no longer visible. It is appreciated that any visual attributes could be used to depict tentative implemented connections, e.g., color, shading, etc.

At step 170, the selected connection is implemented at the network level using well known techniques. In some embodiments, the implementation is made by routers, switches or hubs within the control of the network manager. As discussed above, the connection is automatically made to the appropriate port in the node selected when there are multiple ports available. Once the selection has been made, process 100 ends at step 199. Process 100 can be repeated when a user desires a new network connection.

Embodiments of the present invention can be referred to as interactive drag and snap connection tools. Such tools allow users to quickly connect two compatible nodes in a graphical depiction of a network environment with heterogeneous nodes. Compatible nodes are automatically determined thereby eliminating trial-and-error connection techniques. The interactive drag and snap connection tool allows a user "Mouse-Down" on a node icon in a display, and then drag a connection cursor away from the node icon in one embodiment.

The connection cursor can have a tunable radius of influence, also known as a snap radius, such that, at any time another icon representing a node capable of being connected (whose connection capability has been automatically determined) enters the radius of influence, a second tentative connection line is formed between the connection cursor and the second node icon. At this point the user may stop dragging the connection cursor by releasing the mouse button, and the two node icons become graphically connected and the connection can be realized in the represented network.

In the event that no compatible node icon exists within the radius of influence at the time the mouse button is released, the connection is invalidated. If more than one compatible node icon exists within the radius of influence, then in one embodiment the tentative connection is automatically formed with the node represented by icon that is closest to the connection cursor.

FIG. 2 illustrates an exemplary on-screen graphical display as may be found in embodiments of the present invention illustrating several node icons representing nodes of a network. In the exemplary network illustrated in iconic form in FIG. 2, there are five connectable nodes. For the purpose of example, node icon 201 can represent a server, node icon 202 can represent a subnet, node icons 203 and 204 can represent hardware firewalls, and node icon 205 can represent a work center computer. As was discussed above, the node represented by icon 202 is allowed to connect to a subnet such as represented by node icon 202 but not directly to a firewall such as represented by icons 203 or 204. The node represented by node icon 201 (again, representing a server in this example) can also connect directly to node icon 205. It is noted that, in this embodiment, the location of the node icons in the display screen may have no bearing on the physical location of the actual devices. The nodes may be heterogeneous nodes.

It is noted here that a network can comprise large numbers of nodes. While FIG. 2 shows an on-screen display 200 containing only five icons representing five nodes, a display of a graphically represented network may contain any number of node icons. Showing five icons in FIG. 2, and subsequent, is solely for the purpose of illustration and does not limit embodiments to any fixed number of icons.

FIG. 3 illustrates the exemplary on-screen graphical display 200a of an embodiment of the present invention when a user has made a selection of a node icon, in this case, node icon 201 representing a server node. In one embodiment, when selected, the selected node is highlighted by any visual attribute 303. Also, when a selection is made, a tentative connection line 302 can be presented between the selected icon 201 and the on-screen cursor 301.

In one embodiment, determination of allowable connection is automatically made for all connectable nodes and the icons for allowable nodes are highlighted (by any visual attribute) as at subnet node icon 202 and computer node icon 205. This determination is made automatically based on the selected node. Firewall node icons 203 and 204 are not shown highlighted because they are not allowable connections for selected server represented by node icon 201. When on-screen cursor 301, in this embodiment, is moved, tentative connection line 302 stays connected to it.

Figure 4:
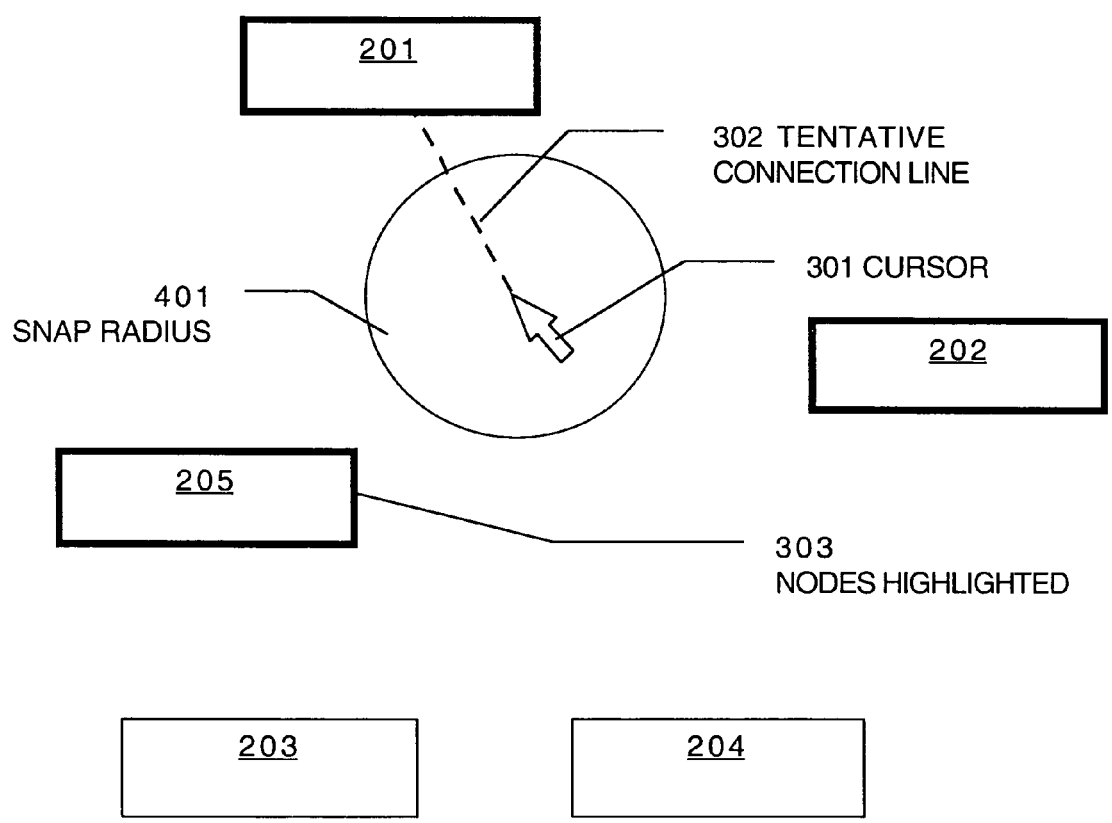
FIG. 4 illustrates an exemplary graphical display of network connection snap radius in accordance with an embodiment of the present invention.

FIG. 4 illustrates an on-screen display 200b with the presentation of a snap radius indication, which in this example is a circle 401 centered on on-screen cursor 301. The snap radius circle 401 stays centered on the cursor, in this embodiment, as the cursor moves in the graphical display.

Figure 5:
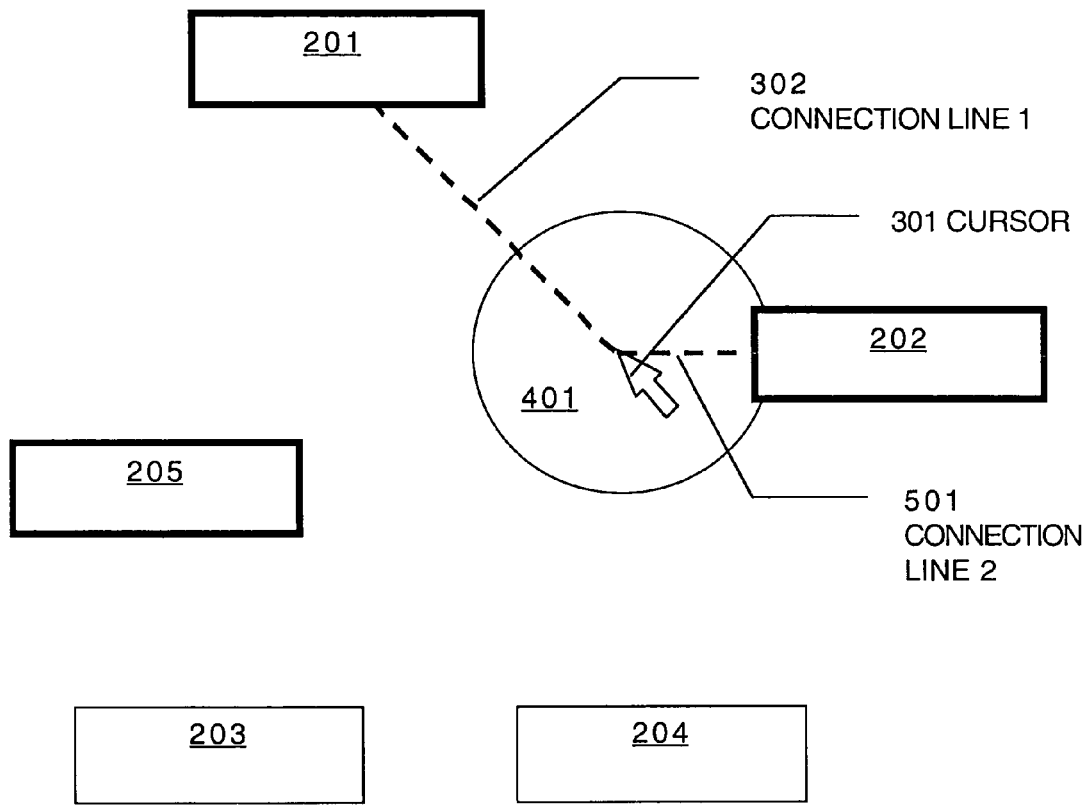
FIG. 5 illustrates an exemplary graphical display of a first allowable network connection in accordance with an embodiment of the present invention.

FIG. 5 illustrates an on-screen display 200c with on-screen cursor 301 being moved in the display to a point where subnet node icon 202 falls within the snap radius 401. In one embodiment, if subnet node represented by icon 202 is an allowable connection for the first selected node, node icon 202 becomes highlighted. In another embodiment, if the node represented by icon 202 is an allowable connection, tentative connection line 501 is presented. At this point, if the user selects node icon 202, a fixed connection depiction is formed between the represented nodes.

Figure 6:
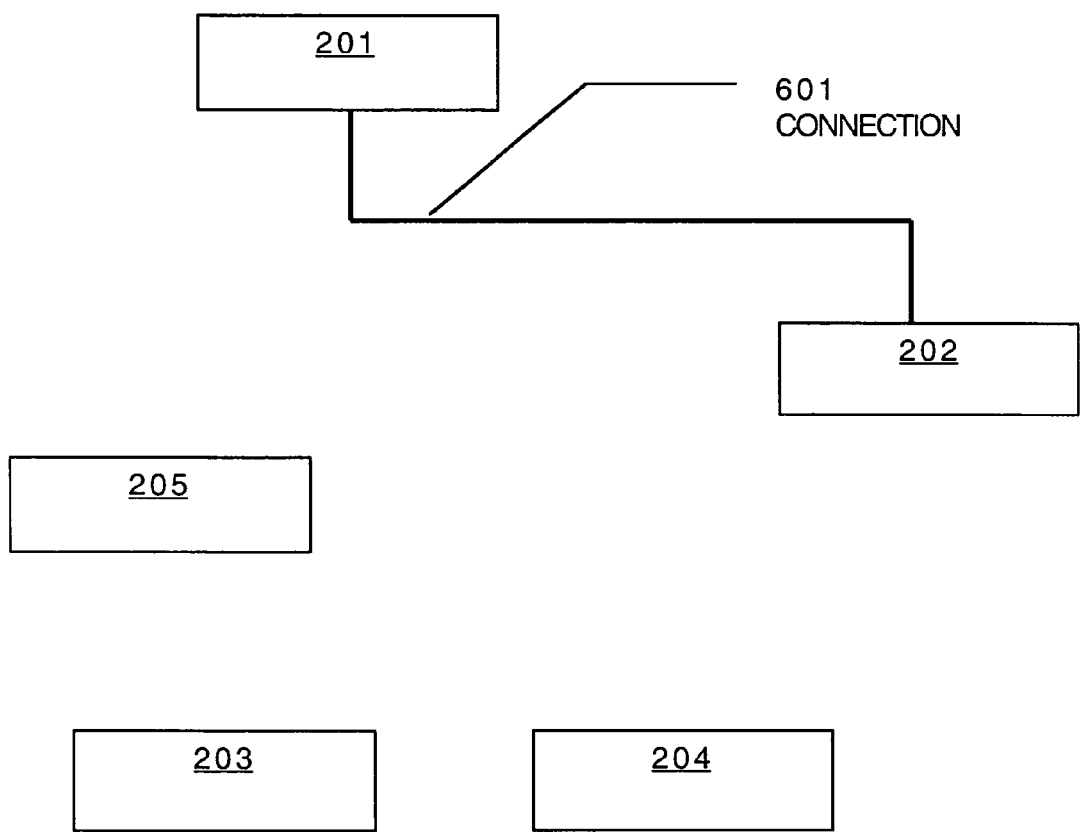
FIG. 6 illustrates an exemplary graphical display of a graphically implemented network connection in accordance with an embodiment of the present invention.

FIG. 6 illustrates graphic display 200d showing the forming of a fixed connection depiction 601 between the first selected node icon and the second selected node icon as indicated by fixed connection line 601. The presentation of fixed connection line 601 accompanies the implementation of an actual connection between the network nodes represented by icons 201 and 202 which is made at the network level using well known techniques. It is noted, however, that implementations, in some embodiments, can be accomplished by switches, hubs, routers, and other elements comprising network infrastructure which are not represented as nodes in the graphic display.

It is also noted that implementation may take place at some time other than the presentation of fixed connection line 601. In one embodiment, all connections formed in the graphic display take place after a complete connection set is formed.

Figure 7:
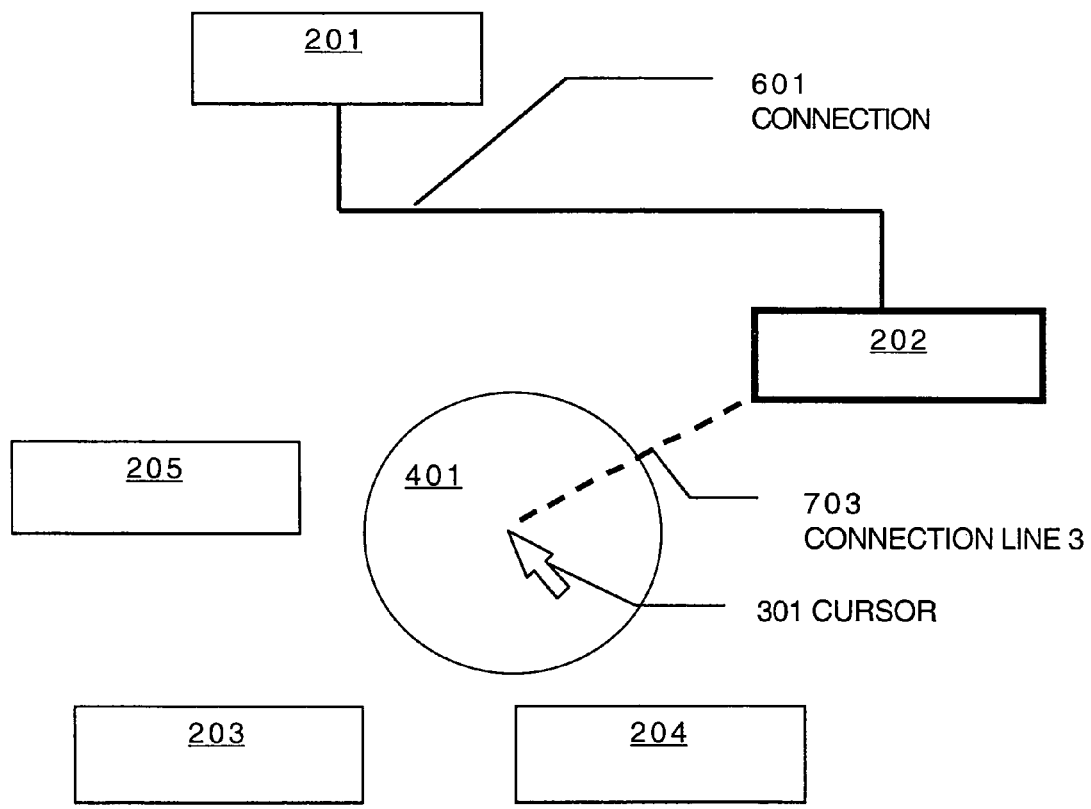
FIG. 7 illustrates an exemplary graphical display of second tentative network connection and snap radius in accordance with an embodiment of the present invention.

FIG. 7 illustrates graphic display 200e in which node icon 202 has been selected for a second connection. Here, a third tentative connection line 703 is presented between the selected icon and the on-screen cursor 301. In this embodiment, snap radius 401 is again presented. When tentative connection 703 is presented in the example shown, icon 202 is also highlighted. However, other embodiments may present only a tentative connection line 703 as an indication of selection of a first node for a connection attempt.

Figure 8:
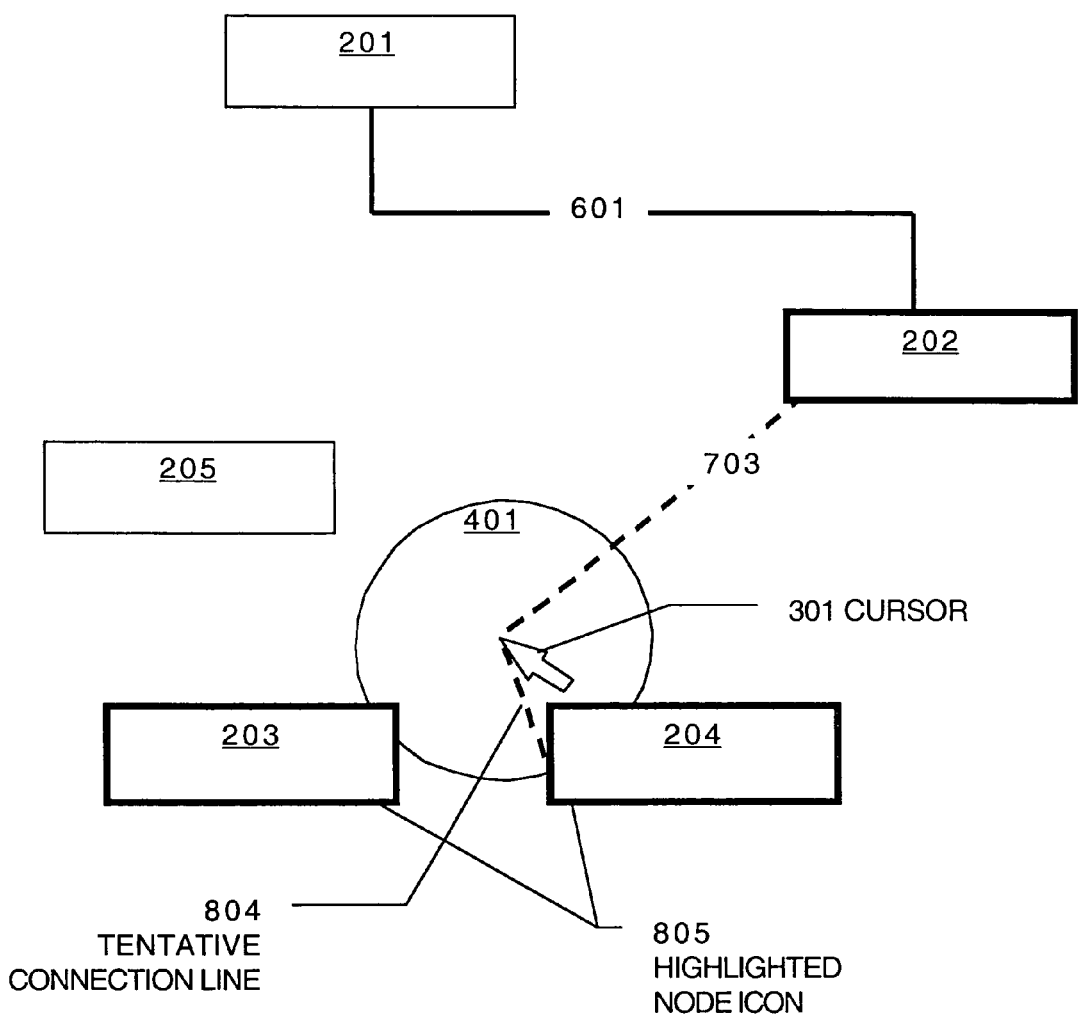
FIG. 8 illustrates an exemplary graphical display of a closest allowable network connection in accordance with an embodiment of the present invention.

FIG. 8 illustrates graphic display 200f in which mouse cursor 301 has been moved so that both node icon 204 and node icon 203 fall within snap radius 401. In this embodiment, connection between the node represented by icon 202 and those represented by icons 203 and 204 are evaluated. It is noted that a determination of allowability has been made in this example based on selected node 202 and both icons 203 and 204 are highlighted. However, tentative connection line 804 is presented only between mouse cursor 301 and node icon 204 because node icon 204 is represented by the closest allowable connection icon.

It is noted again that, in some embodiments of the present invention, all nodes representing allowable connection nodes for a selected first node are evaluated and those icons representing nodes to which connection is allowable are highlighted. However, in the embodiment illustrated, evaluation is not made until a node's icon falls within snap radius 401. Here, evaluation has determined that connection to the nodes represented by icons 203 and 204 are allowable. Icons 203 and 204 are then highlighted and tentative connection line 804 is presented to the closest allowable node icon. Connection is not formed, however, until selected by the user by either a drag-and-drop, in this embodiment, or a second mouse click in another embodiment.

Figure 9:
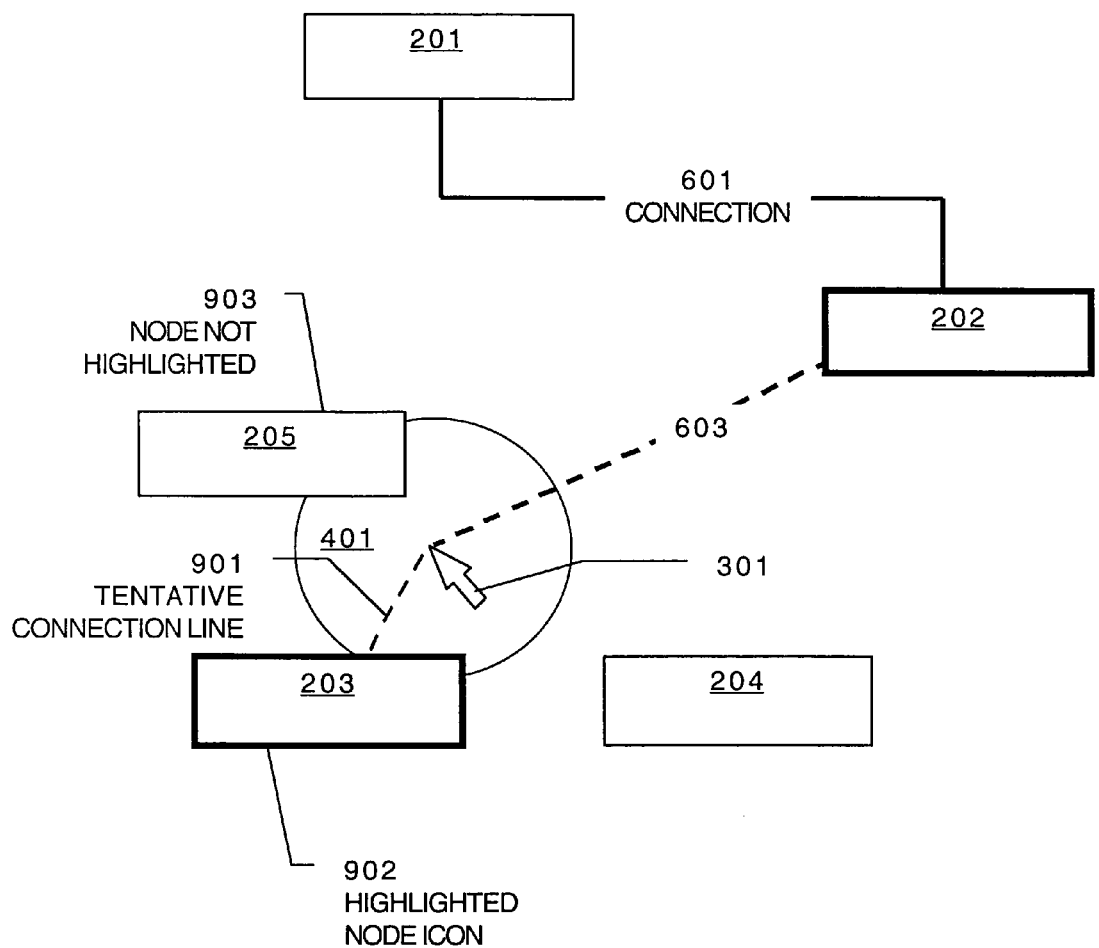
FIG. 9 illustrates an exemplary graphical display of an allowable network connection and highlighted node icon in accordance with an embodiment of the present invention.

FIG. 9 illustrates graphic display 200g in which mouse cursor 301, with attached snap radius indicator circle 401, has been moved to a point in which both node icon 203 and node icon 205 fall within the snap radius. In this example, in this embodiment, both nodes represented by the two icons within the snap radius are evaluated for potential connection to the node represented by icon 202. It is noted that mouse cursor 301 is closer to icon 205 than to icon 203. However, evaluation has determined, in this example, that connection to node represented by icon 203 is allowable but connection to node represented by icon 205 is not. Thus node icon 203 is highlighted and tentative connection line 901 is presented. It is noted that icon 205 is not highlighted as shown by screen attribute 903 and no tentative connection line is formed between icon 205 and mouse cursor 301.

Figure 10:
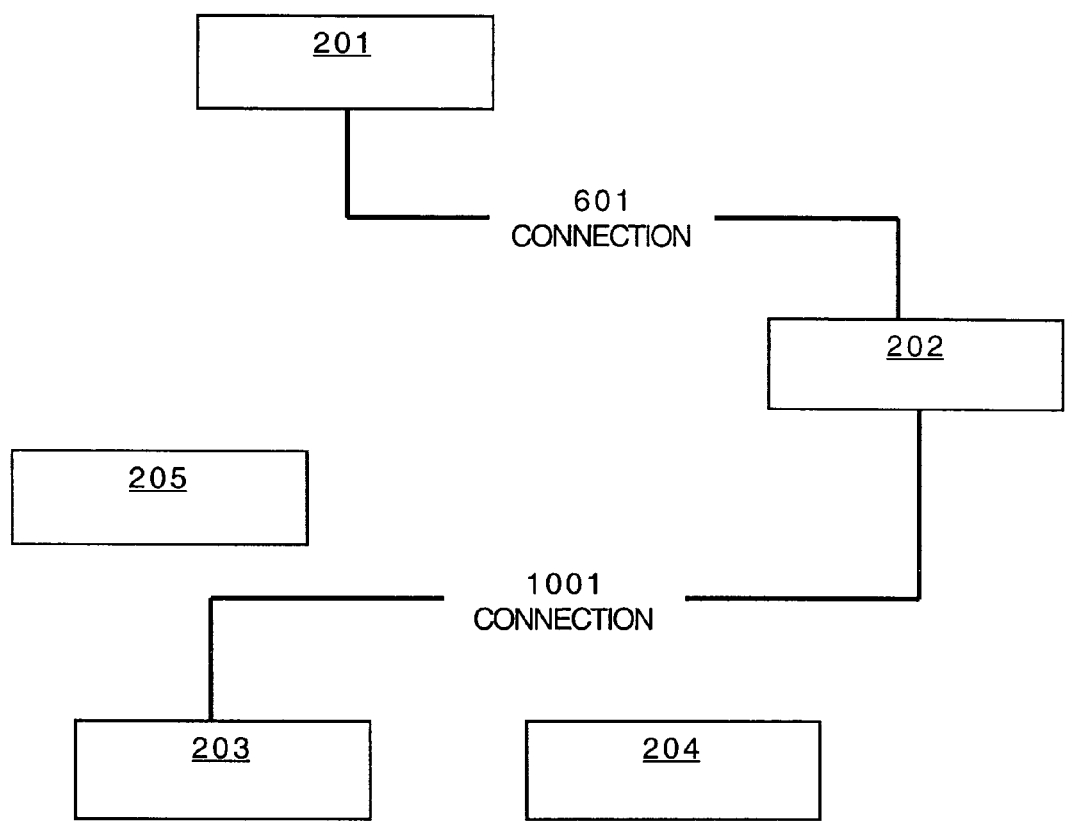
FIG. 10 illustrates an exemplary graphical display of a second graphically implemented network connection in accordance with an embodiment of the present invention.

FIG. 10 shows graphic display 200h after selection has been made of a connection between the nodes represented by icons 202 and 203. A second fixed connection depiction or line 1001 is presented to indicate the selection of icon 203 and thus the connection between the nodes represented by icons 202 and 203. In an embodiment of the present invention, each connection is implemented in the represented network's infrastructure at each connection selection. In another embodiment, a complete set of connections is made in graphic display 200h before the connections are implemented. In either example, however, the design and selection of interconnections between nodes in a network are greatly aided by a graphical tool which evaluates connections between nodes prior to their being implemented.

The speed at which graphical representations of connections can be made is increased by reducing the demands of targeting a particular node through the use of a snap radius, or visual radius of influence. The snap radius enables a visual tentative connection, indicated by the display of a tentative connection line, without requiring a precise alignment of a cursor and a network node icon target in the graphic display.

Figure 11:
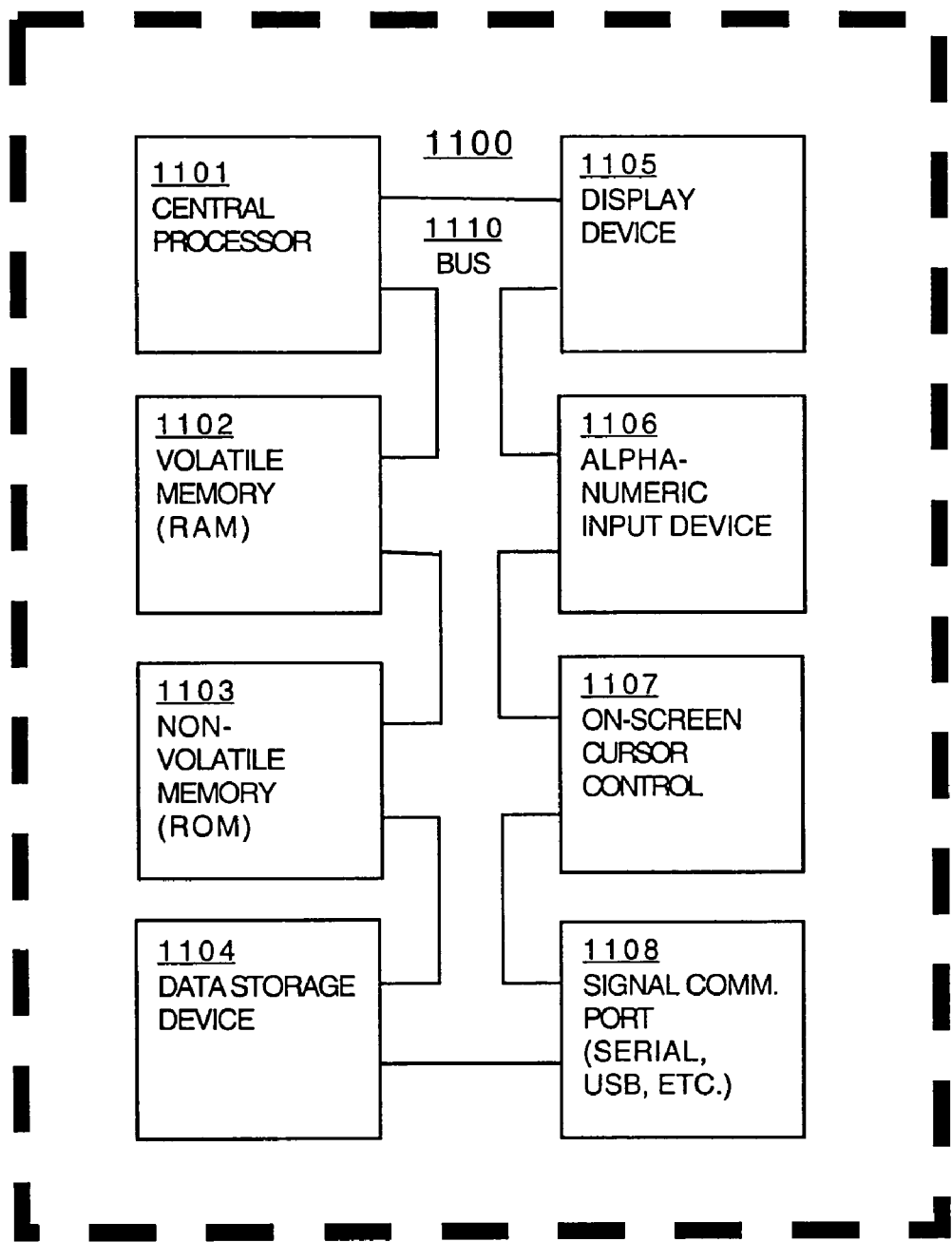
FIG. 11 illustrates a block diagram of a generic computer in accordance with an embodiment of the present invention.

Embodiments of the present invention discussed here may be implemented as software programming code used by a computer similar to the generic computer illustrated in FIG. 11, in block diagram form or in networks employing computing devices. One embodiment is enabled to be implemented in a workstation which employs a remote processor.

A computer, such as exemplary server system 1100, comprises bus 1110 which electronically connects central processor 1101, volatile random-access memory (RAM) 1102, non-volatile read-only memory (ROM) 1103 and data storage device 1104. Optional display device 1105 is also connected to the bus. Similarly connected are optional alpha-numeric input device 1106, on-screen cursor control 1107, and signal input/output (I/O) device 1108. Cursor control 1107 may be any device suitable to move an on-screen cursor, such as a mouse, trackball, keyboard, joystick, etc. Signal I/O device 1108 could be implemented as a serial connection, USB, an infrared transceiver or an RF transceiver. In this embodiment of the present invention, device 1108 is utilized to provide connection with a network and through it, the Internet. Data storage device 1104 can be the repository for instructions implementing embodiments of the present invention.

A typical workstation employing a remote processor also comprises a bus such as bus 1110 which electronically connects a processor such as processor 1101, to other components. However, some or all of the components illustrated in generic computer 1100, or their equivalents, may be connected to each other through network connections and, as discussed earlier, embodiments of the present invention may be implemented in part in a remote computing device or processor. In one such embodiment, the displayed icons and graphical connections discussed earlier may be implemented in a display that is local to a user while the processing that controls the functions of the displayed objects may be implemented remotely.

Embodiments of a novel method and system for interactive network node connection management have been disclosed herein. Using embodiments of the present invention, managers of provisionable and reconfigurable networks are able to rapidly connect, and to reconfigure connections of, nodes in a network. The connections are automatically checked for compatibility and then rapidly and automatically implemented.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method, comprising:

presenting a graphical display of a plurality of graphical depictions representing nodes in a network;

accepting a user selection of a first graphical depiction representing a first node, wherein accepting the user selection comprises presenting a movable graphical line between said first graphical depiction and an on-screen cursor;

automatically determining allowability of a connection to a second node represented by a second graphical depiction;

indicating said allowability on said display;

accepting a user selection of said second graphical depiction; and displaying a graphical representation of an allowable connection between said first node and said second node.

2. The method described in claim 1 wherein said accepting a user selection of a first graphical depiction comprises highlighting of said first graphical depiction with a visual attribute.

3. The method described in claim 1 wherein automatically determining allowability of a connection to said second node comprises:
  determining whether said second graphical depiction is within a certain radius of said on-screen cursor; and
  in response to a determination that said second graphical depiction is within a certain radius of said on-screen cursor, determining whether a connection between said first node and said second node is allowed.

4. The method described in claim 3 wherein said certain radius is displayed as an on-screen radius represented by a circle centered around said on-screen cursor.

5. The method described in claim 4 wherein said on-screen radius is user selectable.

6. The method described in claim 3 wherein indicating said allowability comprises presenting a movable graphical line between said on-screen cursor and said second graphical depiction.

7. The method described in claim 1 wherein indicating said allowability comprises presenting a movable graphical line between said on-screen cursor and said second graphical depiction.

8. The method described in claim 1 wherein said automatically determining allowability of a connection to a second node comprises accessing data in a memory-resident database of allowable connections to said first node.

9. The method described in claim 1 wherein said graphical representation of a connection between said first node and said second node comprises a line between said first graphical depiction and said second graphical depiction.

10. The method described in claim 1 wherein said network is a provisionable network, wherein said nodes are heterogeneous, and wherein said method further comprises implementing said allowable connection in said network such that an actual connection is formed between said first node and said second node.

11. A computer system having one or more processors coupled to a memory wherein said memory comprises instructions that, when executed by the one or more processors, cause the one or more processors to implement a method comprising:
  presenting a graphical display of a plurality of graphical depictions representing nodes in a network;
  accepting a user selection of a first graphical depiction representing a first node, wherein accepting the user selection comprises presenting a movable graphical line between said first graphical depiction and an on-screen cursor;
  automatically determining allowability of a connection to a second node represented by a second graphical depiction;
  indicating said allowability on said display;
  accepting a user selection of said second graphical depiction; and
  displaying a graphical representation of an allowable connection between said first node and said second node.

12. The computer system described in claim 11 wherein said accepting a user selection of a first graphical depiction comprises highlighting of said first graphical depiction with a visual attribute.

13. The computer system described in claim 11 wherein automatically determining allowability of a connection to said second node comprises:
  determining whether said second graphical depiction is within a certain radius of said on-screen cursor; and
  in response to a determination that said second graphical depiction is within a certain radius of said on-screen cursor, determining whether a connection between said first node and said second node is allowed.

14. The computer system described in claim 13 wherein said certain radius is displayed as an on screen radius represented by a circle centered around said on-screen cursor.

15. The computer system described in claim 14 wherein said on screen radius is user selectable.

16. The computer system described in claim 13 wherein indicating said allowability comprises presenting a movable graphical line between said on-screen cursor and said second graphical depiction.

17. The computer system described in claim 11 wherein indicating said allowability comprises presenting a movable graphical line between said on-screen cursor and said second graphical depiction.

18. The computer system described in claim 11 wherein said automatically determining allowability of a connection to a second node comprises accessing data in a memory-resident database of allowable connections to said first node.

19. The computer system described in claim 11 wherein said graphical representation of a connection between said first node and said second node comprises a line between said first graphical depiction and said second graphical depiction.

20. The computer system described in claim 11 wherein said network is a provisionable network, wherein said nodes are heterogeneous, and wherein said method further comprises implementing said allowable connection in said network such that an actual connection is formed between said first node and said second node.

* * * * *